May 18, 1948. L. A. TROFIMOV 2,441,605
CONSTANT SPEED DYNAMOELECTRIC POWER TRANSMISSION UNIT
Filed Oct. 23, 1942 3 Sheets-Sheet 1
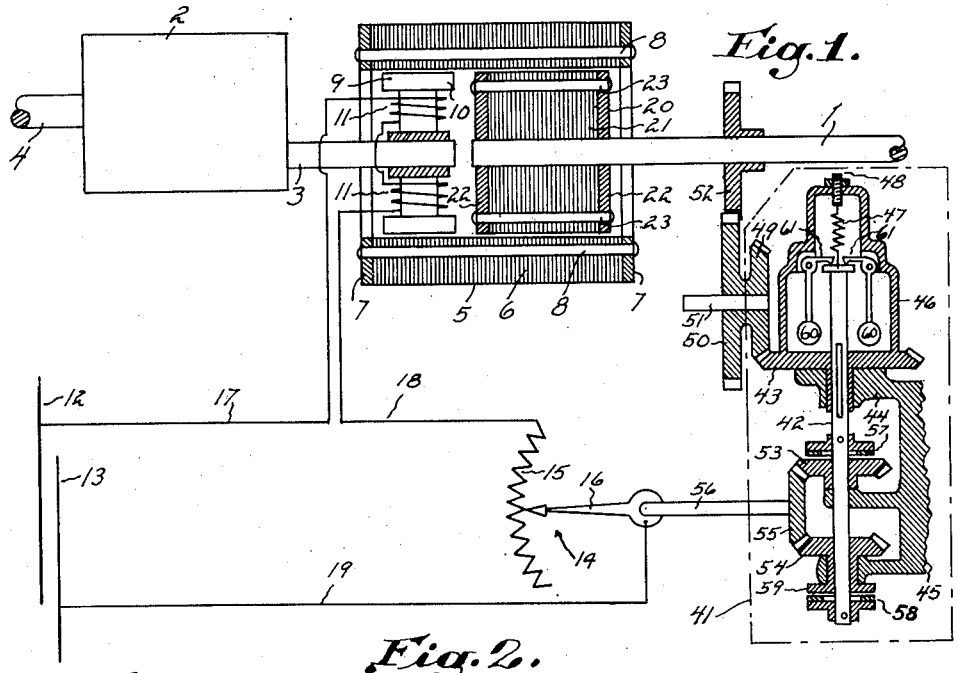
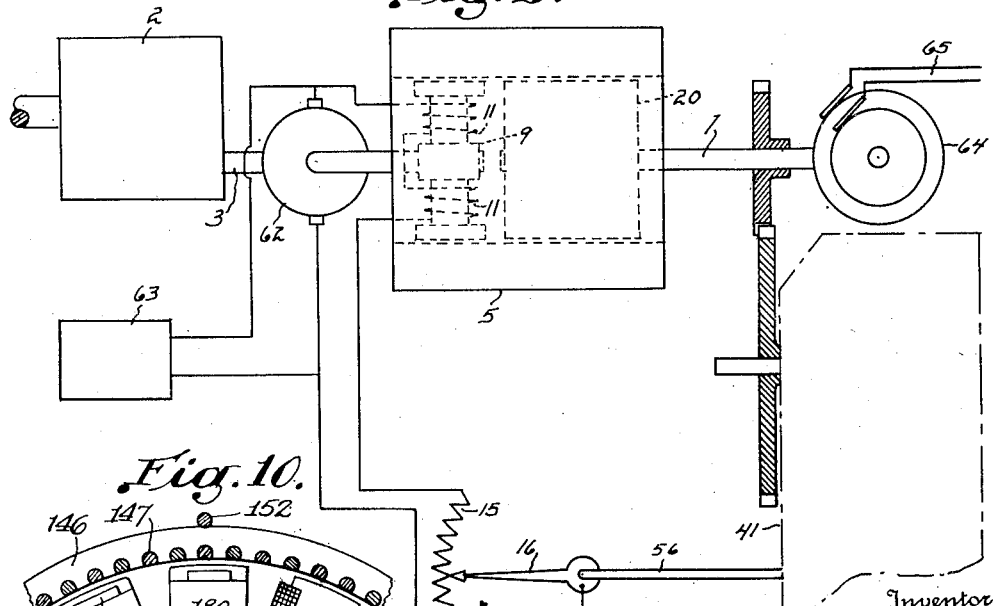
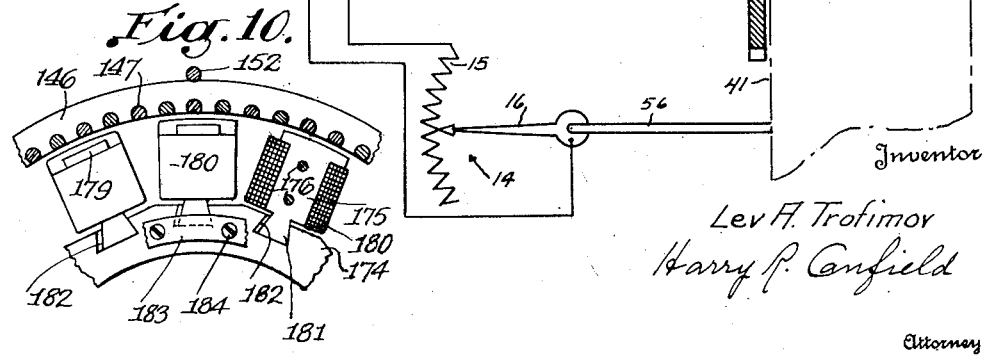
Inventor
Lev A. Trofimov
Harry P. Canfield
Attorney May 18, 1948. L. A. TROFIMOV 2,441,605
CONSTANT SPEED DYNAMOELECTRIC POWER TRANSMISSION UNIT
Filed Oct. 23, 1942 3 Sheets-Sheet 2

Inventor
Lev A. Trofimov
By Harry P. Canfield
Attorney

May 18, 1948. L. A. TROFIMOV 2,441,605
CONSTANT SPEED DYNAMOELECTRIC POWER TRANSMISSION UNIT
Filed Oct. 23, 1942 3 Sheets-Sheet 3

Inventor
Lev A. Trofimov
By Harry R. Canfield
Attorney

Patented May 18, 1948

2,441,605

UNITED STATES PATENT OFFICE 2,441,605

CONSTANT SPEED DYNAMOELECTRIC POWER TRANSMISSION UNIT

Lev A. Trofimov, Willoughby, Ohio

Application October 23, 1942, Serial No. 463,019

4 Claims. (Cl. 318—146)

This invention relates to power apparatus for driving a load at constant speed by power supplied by a power source at variable speed.

In the various arts loads are driven at variable speed and a variable speed motor (electric motor, internal combustion engine, etc.) is provided as the source of power. It is desirable in some cases, however, to utilize power from this same variable speed power source to concurrently drive a load at constant speed.

An illustration of such a case would be, the driving of a primary load by a variable speed internal combustion engine and the driving of an auxiliary load such as an electric generator at constant speed by a power take-off from the engine.

In other cases, it is desirable to drive a primary or sole load at constant speed from a variable speed power source.

Considered apart from the power source, the invention herein described is a power transmission unit; and considered with the power source, the invention is a power supplying apparatus generally.

It is among the objects of the present invention:

To provide generally an improved power apparatus by which a load may be driven at constant speed by a power supplying motor operating at variable speed;

To provide generally an improved power transmission for transmitting to a load to drive it at constant speed, the power of a power source supplied at variable speed;

To provide an improved power transmission or power supplying apparatus comprising an electric alternator element driven or arranged to be driven at variable speed, a power delivering electric induction motor element driven by electric power supplied thereto by the alternator, and means responsive to the speed of the motor element to control the power supplied by the alternator to maintain the speed of the motor element substantially constant;

To provide an improved power transmission mechanism comprising a variable speed direct-current field element arranged to rotate within an alternating current type stator and to produce a rotary magnetic field therein; and an alternating current type rotor element arranged to rotate within the stator element and to be driven by the rotary field;

To provide an improved power transmission mechanism comprising a variable speed direct-current-energized field element arranged to rotate within an alternating current type stator and to produce a rotary magnetic field therein; and an alternating current type rotor element arranged to rotate within the stator element and to be driven by the rotary field; and comprising governing means by which the energization of the direct current field element is weakened responsive to tendency of the rotor element to increase in speed, and vice versa;

To provide an improved power transmission mechanism comprising an alternating current type stator and a power delivering rotor rotatable therewithin by a magnetic field in the stator which rotates at variable rotational velocity; and comprising means to weaken the strength of the rotating field responsive to tendency of the rotor to increase in speed, and vice versa;

To provide an improved power transmission supplied with power from a variable speed source and delivering power at constant speed and in which a double transformation of power is provided whereby the torque supplied by the source may be different from the delivered torque.

Other objects will be apparent to those skilled in the art to which my invention appertains.

My invention is fully disclosed in the following description taken in connection with the accompanying drawing in which;

Fig. 1 is a diagrammatic view illustrating an embodiment of my invention and showing in some detail a governor associated therewith;

Fig. 2 is a view similar to Fig. 1 illustrating the embodiment of Fig. 1 in a different environment of use, in which the governor, which is indicated diagrammatically only, performs functions additional to those which it performs in the showing of Fig. 1;

Figure 9:
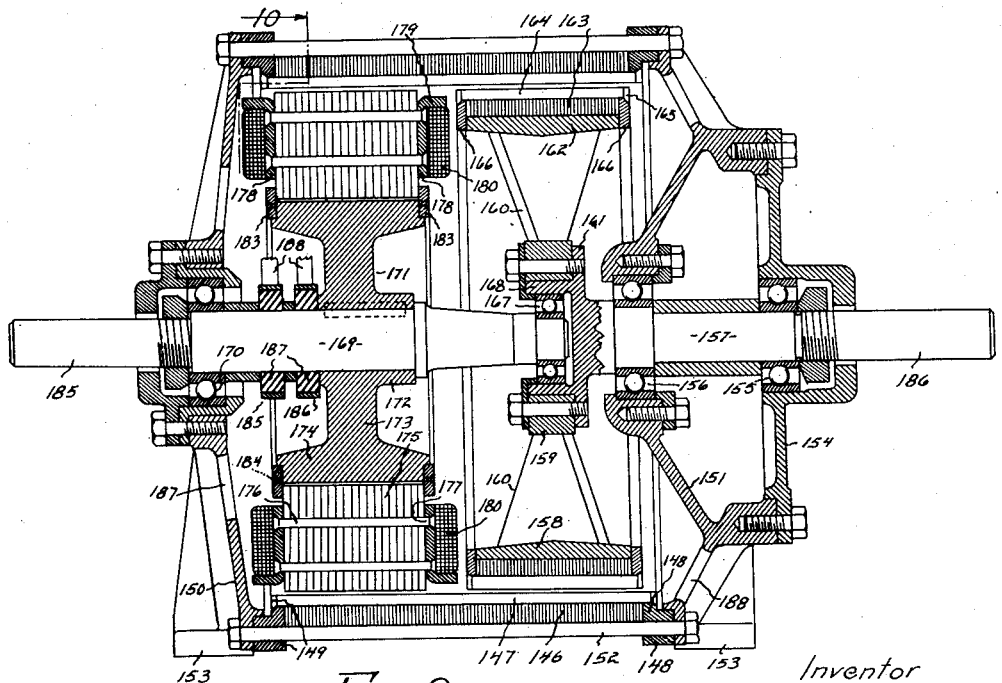

Figs. 5, 6, 7, and 8 are views illustrating governors of different forms which may be substituted when desirable for the governor of Fig. 1;

Fig. 9 is a longitudinal sectional view of an actual mechanism or apparatus by which the embodiment of Fig. 1 may be practiced.

Fig. 10 is a fragmentary view with parts broken away and parts in section taken from the plane 10 of Fig. 9.

Referring to Fig. 1 of the drawing, I have shown at 1 a shaft the rotational velocity of which, in the practice of the invention, is to be maintained substantially constant, and which may be utilized to rotatively drive a load not shown. At 2 is indicated diagrammatically a source of rotational power which operates at variable speed and drives at variable speed a shaft 3 from which power to drive the shaft 1 is derived. The power source 2 may drive a primary load not shown by means of a shaft 4, in which case the shaft 3 would be an auxiliary power take-off shaft; or the shaft 3 may be itself the primary power supplying shaft of the source 2.

At 5 is a stator element of the alternating current type, that is to say it comprises a tubular body 6 of laminated steel having end plates 7—7 and bar type conductors 8—8 extending through perforations in the laminations and connected to the end plates 7—7.

Driven by the shaft 3 or mounted thereon is a rotary field element 9 of the direct current type comprising pole pieces 10 in which a magnetic field is produced by direct current field windings 11—11 which, in the present embodiment are supplied with current from direct current mains 12 and 13, the degree of energization being under the control of a rheostat shown generally at 14 and comprising a resistor 15 and an arm 16 movable thereover, the energizing circuit being from the main 12 by a wire 17 to and through the windings 11 in series and by a wire 18 to the resistor 15, through a portion of it to the arm 16 and by a wire 19 to the supply main 13.

Rotatable within the stator 5 is also a rotor element 20 of the alternating current type and this may have the construction of the rotor of an ordinary commercial squirrel cage induction motor. This rotor therefore comprises a body of laminated steel, 21, end plates 22—22 connected by bars 23—23 extending through perforations in the laminations and connected to the end plates 22—22. The rotor 20 is mounted upon or drivingly connected with the shaft 1.

It will be observed that as illustrated in Fig. 1, the shafts 3, and 1 axially aligned but separate from each other; and that the stator 5 is of sufficient axial extent to surround both the direct current field 9 and the alternating current rotor 20.

There may be any desired or suitable number of poles and windings for the direct current field element 9, and any suitable number of conductor bars 8 and 23 although only two of each are illustrated. The bars 8 are preferably equally spaced around the axis of the tubular stator, and the bars 23 equally spaced around the axis of the rotor; the stator and the rotor thus both being of the so-called "squirrel cage" construction which term it is believed will identify the type, characteristics, and construction of these elements to those skilled in the art without further illustration or description.

In the operation of the embodiment of Fig. 1 thus far described, rotation of the direct current field element 9, generates alternating current in the short circuited bars 8—8; the current generated in one bar flowing therethrough to one end plate 7, through the end plate, and back by another bar to the other end plate, and thence to the one bar in a well known manner.

The alternating current generated in the bars 8 by the rotating field element 9, produces alternating magnetism in the stator 5 and rotor 20; and the polarity thereof changes rotationally in correspondence with rotation of the direct current field element 9, so that there is in the stator and rotor 20, a rotating magnetic field very similar to the rotating magnetic field in the stator and rotor of an ordinary commercial squirrel cage induction motor.

This rotating stator field, reacting upon the conductor bars 23—23 of the rotor 20, generates current therein which reacting upon the field itself developes rotational torque at the rotor 20 causing it to rotate; the action being similar to that of a squirrel cage induction motor. The shaft 1 is thus rotated.

For reasons which will become apparent hereinafter, the rotor bars 23—23 or the short circuited electric circuits thereof including the bars and the end plates 22—22, are designed to have relatively high resistance, so that for a given rotational speed of the shaft 3 and direct current field element 9, the torque curve of the rotor 20 as its speed changes starting from rest and coming up to the speed of the rotating alternating field, is approximately that shown by the curve 29 in Fig. 3; wherein as shown, when the rotor is at rest the torque, at 30, is of a substantial value and rises as the rotor speeds up until the rotor speed is approximately 40% of the synchronous speed (that is to say, the speed of the rotating alternating magnetic field) as shown at 31; and from thereon, as the rotor speeds up, the torque decreases along the line 32 and becomes zero as at 33, when and if the rotor rotates at 100% synchronous speed. The curve 29 as thus described is substantially the same as the torque-speed curve of a squirrel cage induction motor when the electrical path of the short circuited bars of the rotor has suitable resistance; and the rotor 20 is preferably so designed as to have a torque-speed curve of these characteristics by giving to it the necessary quantitative electrical values as well understood by those skilled in this art.

Figure 3:
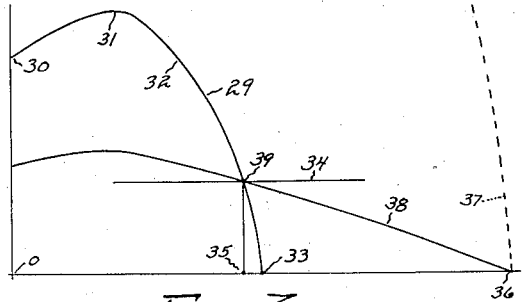
Fig. 3 is a diagram of speed and torque by which some of the operative functions of the embodiments of Figs. 1 and 2 may be better understood.

For purposes of illustration and description, it will be assumed that the minimum speed at which the shaft 3 will rotate is that represented by the speed 0—33 in Fig. 3; and it will be assumed that the maximum torque necessary to be developed at the rotor 20 to drive the load connected to the shaft 1, will be represented by the line 34 of Fig. 3. To drive this load and develop this torque, the rotor 20 will lag behind the rotating alternating field and run at a speed represented by the speed point 35, Fig. 3, just as the rotor of a squirrel cage induction motor lags behind its rotating field.

The speed 0—35, Fig. 3 may therefore be taken as the selected constant speed at which the shaft 1 is to rotate for different loads thereon or changes of speed of the power source shaft 3. Suppose therefore that the power supplying shaft 3 should increase in speed for example to double its speed. This will cause the speed of rotation of the alternating field to increase to the speed 0—36 of Fig. 3; and with the same energization of the field windings 11—11, the torque developed at the rotor 20 would have the characteristics indicated fragmentarily at 37, and the rotor 20 would accordingly rotate at approximately double its desired speed; but if concurrently with the increase of speed of the direct current field, its energization be suitably decreased, the torque curve at the increased input speed, may be brought down to that shown by the curve 38, which curve crosses the torque curve 34 at 39; so that the torque necessary to drive the load will again be developed at the speed 0—35. Thus at different speeds of the input shaft 30, there are corresponding values of energization for the field windings 11 at which the rotor 20 and load shaft 1 will rotate always at the same speed.

In the embodiment of Fig. 1 this accomplished by means of a governor shown generally at 41 which, upon any change or tendency to change of speed of the load shaft 1, the rheostat 14 is operated to make a corresponding change in the energization of the field windings 11 to maintain the speed of the load shaft 1 constant.

The governor comprises a vertical floating shaft 42 having a spline connection with a bevel gear 43 resting upon and rotatable in a bracket 44 on a main frame 45. The gear 43 supports a housing 46 in the upper portion of which is a spring 47 counterbalancing and suspending the shaft 42, and parts associated therewith, the tension of the spring being adjustable to this end by a screw 48 in the upper part of the housing 46.

The gear 43 is rotated by a bevel gear 49 connected to or forming part of a gear 50 rotatable on a shaft 51, the bearings for which have been omitted for simplicity, and the gear 50 being meshed with a gear 52 on or rotatably connected to the load shaft 1.

Suitably mounted on the main frame 45 and co-axial with the floating shaft 42 is a pair of vertically spaced bevel gears 53 and 54 meshed with a bevel gear 55 mounted upon a governor shaft 56 connected to the rheostat arm 16 to rotate it over the resistor 15. Friction discs 57 and 58 connected to or mounted on the floating shaft 42 and slightly spaced respectively from the gear 53 and a flange 59 on the gear 54, are moved, one or the other, into frictional driving engagement with a corresponding bevel gear 53 or 54, upon axial movement downwardly or upwardly of the shaft 42, to thereby rotate one or the other of the gears, and thereby rotate the governor shaft 56 in one direction or the other.

A pair of governor balls 60—60 are pivotally suspended on the housing 46 at opposite sides of the shaft 42 and have fingers 61—61 engaging the upper end of the shaft 42.

By this construction, the bevel gear 43, shaft 42, friction discs 57—58, housing 46 and balls 60—60 are all rotated in unison by the gears 52, 50, 49 at a velocity determined by that of the shaft 1. The balls 60—60 are subjected to the action of centrifugal force due to this rotation and have been illustrated in the positions which they occupy when the shaft 1 is rotating at the desired constant speed.

If the speed of the shaft 1 should tend to increase slightly, the balls 60—60 will be thrown outwardly away from the shaft 42, and the fingers 61 will press downwardly upon the upper end of the shaft 42 in opposition to the spring 47, and move the shaft downwardly engaging the friction disc 57 with the gear 53, thereby driving it and through it driving the gear 55 and the governor shaft 56, to operate the rheostat 14 in the direction to weaken the field windings 11—11 for the purposes described. If the speed of the shaft 1 should fall or tend to fall below the desired speed, the balls 60—60 will be moved inwardly toward the shaft by the spring 47, thereby causing the shaft 42 to rise and engage the friction disc 58 with the flange 59 on the gear 54, driving the gear 54 and thereby turning the governor shaft 56 in the other direction to strengthen the energization of the windings 11—11.

In this manner, the weakening or the strengthening of the field winding energization goes on until the shaft 1 again attains or is maintained at the desired constant speed, at which speed, the shaft 42 is again balanced in its intermediate position at which the friction discs 57 and 58 are out of engagement with the gear 53 and the flange 59, whereupon the rheostat arm 16 remains in the position to which it was last adjustably moved.

In the foregoing the tendency of the shaft 1 to change its speed upon a change of speed of the shaft 3 has been described. In a similar manner, the shaft 1 will tend to change its speed if the load driven thereby should change in amount, but it is believed that it will now be clear that whatever the cause of the tendency of the shaft 1 to change its speed, the governor will operate to accordingly change the energization of the field windings 11 to restore the speed of the shaft 1 to or maintain it at the preselected constant value.

The actual speed at which the shaft 1 rotates and at which it is maintained may be adjustably varied by adjusting the tension of the spring 47 by the adjusting screw 48 as will be understood, since this changes the speed at which the shaft 42 must rotate to hold the balls 60—60 in the position at which the friction discs are disengaged from their associated gears.

It will be apparent that there is in the embodiment of Fig. 1 a double transformation of power, namely: mechanical power at the shaft 3 is converted into electrical power in the stator 5 and this is converted back into mechanical power in the rotor 20. Because of this double transformation, the speed and torque at the shaft 3 may be different from that at the shaft 1 as described above. Power put in at the shaft 3 may be power at high speed and low torque or low speed at high torque, while the output power at the shaft 1 may be constant speed at all times and at higher or lower torque depending upon the load driven; and the torque driving the direct current field 9 may therefore differ widely from the torque driving the rotor 20.

It will be apparent therefore that the characteristics of the thransmission of power from the shaft 3 to the shaft 1 is radically different from that which would be provided by merely a magnetic coupling between the two, such as has heretofore been disclosed and in which the input torque and the output torque must of necessity be at all times equal.

In the embodiment of Fig. 1, the governor 41 in maintaining the speed of the shaft 1 substantially constant, corrects for changes of speed of the input shaft or of load on the shaft 1.

In some cases, there are other factors or circumstances of environment which must be corrected, to maintain the shaft 1 at substantially constant speed, and illustrative of these are those shown in Fig. 2. In this figure, the windings 11—11 are energized, not from supply mains but from a direct current generator 62 driven by the shaft 3; and the generator 62 besides supplying current to the field windings may also supply current to an electrical load 63; and the load driven by the load shaft 1 may be an electric generator such as an alternator 64 supplying current to a load circuit 65.

In such an environment, variations of speed of the input shaft 3, besides changing the speed of the direct field element 9, will change the speed of the generator 62, causing it to vary the energization of the windings 11; or the electrical load 63 may be extraneously varied; or the electrical load on the generator circuit 65 may vary.

Variations of any one or any number of these four factors will cause the load shaft 1 to tend to change its speed, and the alternator 64 may be supplying current to a load the alternating frequency of which must for various reasons be maintained substantially constant. But with the arrangement illustrated, no matter what cause or combination of causes tend to make the load shaft 1 change its speed, they will be corrected by the governor 41 to maintain the speed of the shaft 1 constant.

Figure 4:
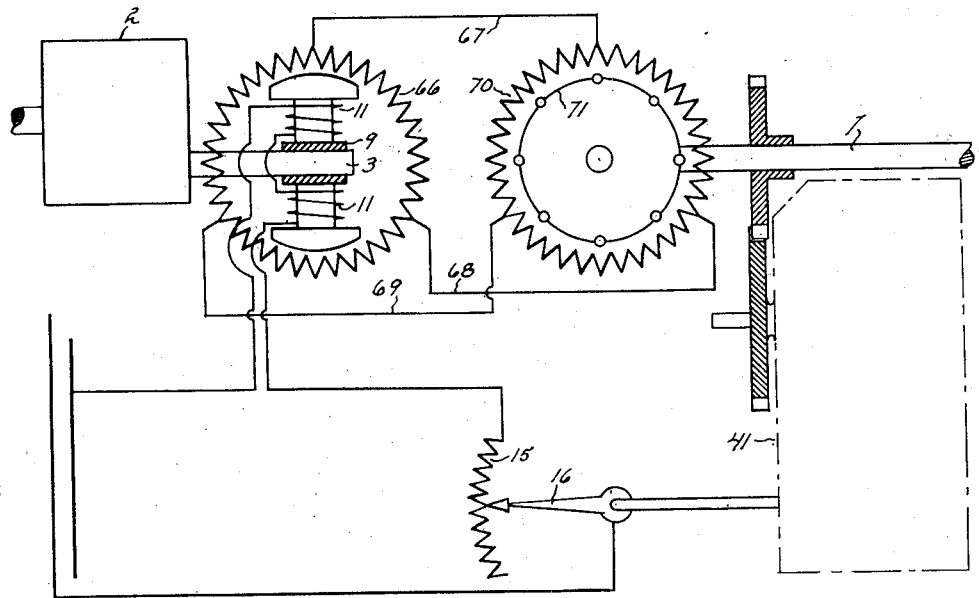
Fig. 4 is a diagrammatic view illustrating a more generalized embodiment of my invention than that shown in Fig. 1.

While I prefer to embody my invention in a unitary structure in which the direct current field element and the alternating current rotor revolve within a common stator as described above and to be hereinafter further described in connection with Fig. 10 this is not in every case essential. The direct current field element may be in one unit driven by the shaft 3, and the rotor 20 may be in another unit connected to the load shaft 1; this being illustrated in Fig. 4 diagrammatically.

The direct current field element 9 driven by the shaft 3 and energized by the field windings 11—11 rotates within a winding of the distributed type, shown at 66, and generates therein three-phase alternating current which is supplied by external wires 67, 68, 69 to a separate distributed winding 70 within which rotates a squirrel cage type rotor 71 connected to the load shaft 1.

Obviously, with this arrangement the winding 70 will produce a rotating magnetic field, rotating at the velocity of the direct current field element 9; and the operation will be substantially the same as that of the embodiment of Fig. 1. The rest of Fig. 4 has been given the same reference characters as Fig. 1 and it is thought that it is unneecssary to further describe it.

In the foregoing embodiments of my invention a governor 41 has been illustrated and described in detail and this same governor has been indicated as associated with the various forms. It will be understood, however, that other types of governors having other modes of operation may be employed and in Figs. 5 to 8 inclusive other governors are illustrated.

These governors in each case rotate a governor shaft 56; and therefore such governors may be applied to the forms previously described instead of the governor 41. The governors of Figs. 5, 6, and 7 have in common the feature that they are actuated by electric current or electric potential produced by a generator driven by the load shaft 1. In each instance, this governor generator may be a generator of small size and output provided especially for actuating the governor, in which case the main load driven by the load shaft 1 would be another and different load; or the main load contemplated to be driven by the load shaft 1 may be an electric generator in which case potential of the main load generator may be used to actuate the governor. The generators driven by the load shaft 1 in Figs. 5, 6, and 7 may therefore be considered as governor generators or as main load generators driven by the load shaft 1.

Figure 5:
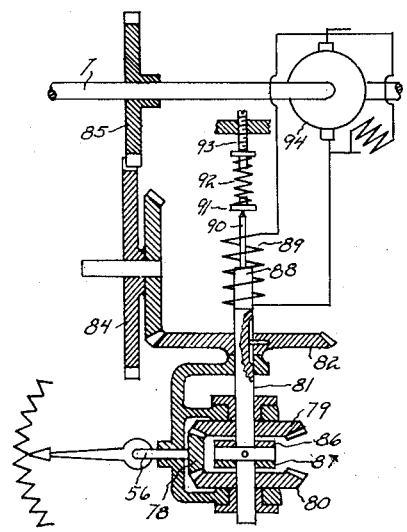

In Fig. 5 the governor is shown somewhat diagrammatically. The governor shaft 56 referred to is driven in one direction or the other by a bevel gear 78 constantly meshed with axially aligned bevel gears 79 and 80. A vertically floating shaft 81 passes through the bevel gears 79 and 80 and is driven by a gear 82 splined thereon, the gear 82 being driven through gears 84, and 85 by the load shaft 1.

The floating shaft 81 has thereon and between the bevel gears 79 and 80, friction discs 86 and 87 slightly spaced respectively from the bevel gears 79 and 80 and the shaft 81 is normally suspended to dispose the discs in this relationship by a magnetic plunger 88 in a winding 89.

The plunger 81 has a stem 90 abutting upon a block 91 which is engaged by one end of a compression spring 92 the other end of which spring engages an adjusting screw 93 by which the compression tension of the spring may be adjusted. The winding 89 is energized across the terminals of an electric generator 94 driven by the load shaft 1.

By this arrangement the desired constant normal speed of the shaft 1 will, by driving the generator 94, cause it to generate a normal potential which, energizing the winding 92, will cause it to counter-balance or support the floating shaft 81 with the friction discs 86 and 87 normally disengaged from both of the bevel gears 79 and 80; and this may be adjustably determined for the shaft 81 by adjusting the spring 92 which opposes the pull of the winding 89 on the plunger 88.

If the load shaft 1 should tend to increase in speed, it will tend to increase the voltage on the winding 89 and cause it to raise the floating shaft 81 from its normal position; or if the load shaft speed should tend to decrease it will allow the floating shaft to be moved downwardly. In one case or the other the friction discs 86—87 will engage the gear 79 or the gear 80, and as will be understood, this will rotate the governor shaft 56 in one direction or the other, moving the rheostat arm 16 over its associated resistor 15. This has the effect, as described above, of neutralizing the tendency of the shaft 1 to change its speed, bringing it back to or holding it at its preselected constant speed.

Figure 6:
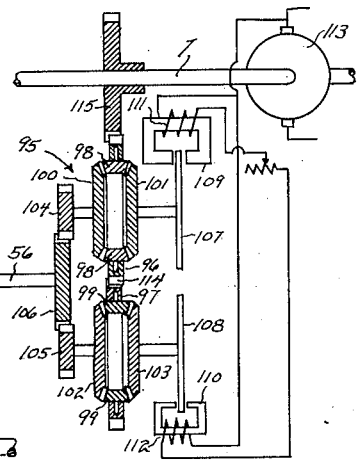

The governor shown in Fig. 6 drives the governor shaft 56 and rheostat arm 16 for the purposes described by means of a double differential gearing mechanism shown generally at 95. This mechanism comprises two spider elements 96 and 97 rotatably supporting, respectively, pairs of pinions 98—98 and 99—99. Meshed with the pinions 98 are differential gears 100 and 101; and meshed with the pinions 99 are differential gears 102 and 103. The differential gears 100 and 102 are connected respectively to pinions 104 and 105 both of which are meshed with a gear 106 on the governor shaft 56. A pair of metallic discs 107 and 108 are connected to the differential gears 101 and 103 respectively.

Electro-magnets 109 and 110, having energizing windings 111 and 112, are provided with poles pieces adjacent to opposite sides of the discs as illustrated, whereby flux in the magnets produced by the windings will exert a braking action opposing rotation of the discs 107—108 in a well known manner. The windings 111 and 112 are energized across the terminals of an electric generator 113 driven by the shaft 1 as described hereinbefore.

The two spiders 96 and 97 are driven in opposite directions by power from the shaft 1, and this may conveniently be done by providing gear teeth on the peripheries of the spiders and meshing them together, as at 114 and driving one of the spiders by a gear 115 on the shaft 1. For simplicity of description it is assumed that the two spiders 96 and 97 are of equal diameter, as are the two pairs of differential gears associated with the spiders respectively, and as are the pinions 104—105.

With this arrangement, the discs 107 and 108 are driven in opposite directions and the pinions 104 and 105 tend to rotate in opposite directions and exert opposite torques on the governor shaft 56. If the two discs 107 and 108 have equal braking torques applied thereto, the torques of the pinions 104 and 105 will be equal and the governor shaft 56 will remain at rest or come to rest if rotating. If the braking torques of one disc is made greater than that of the other, the torque on the corresponding pinion will be greater than that of the other, and the governor shaft accordingly will rotate in one direction or the other, because, as in a gearing of this construction, the torque applied to the spider element in either case divides equally between the corresponding disc and pinion.

To thus vary relatively the torque on the discs 107—108 the following means is provided.

The potential produced by the generator 113 may be called, for the sake of this discussion, normal, when the shaft 1 is rotating at its preselected constant speed.

The windings 111 and 112 are subjected to the potential of the generator 113 as shown. One of the magnets, say the magnet 110, is made of sufficiently small cross-sectional area and it is energized sufficiently by the winding 112 so that it is at all times substantially saturated, whereby increase or decrease of potential on its winding produces no change or only a small change in the flux of the magnet.

The magnet 109, however, is energized by its winding 111 below saturation. The cross-sectional area of the magnet 109 is predetermined so that it produces the same electro-dynamic drag on the discs 107 as does the saturated magnet 110 on the disc 108 when the generator potential is normal.

It follows that magnetism in the magnet 110 remains substantially constant whereas magnetism in the magnet 109 rises and falls with changes of potential, and that both magnets produce the same braking effect when the potential is normal.

If the shaft 1 should tend to increase in speed and cause the generator voltage to ride above normal, magnetism in the magnet 109 will increase and produce greater drag on the disc 107 than that on the disc 108 produced by the magnet 110, and conversely if the shaft 1 should tend to decrease in speed and lower the potential below normal the magnet 109 will produce less drag than the magnet 110.

It follows that if the shaft 1 should tend to increase in speed, the rheostat arm 16 will be turned in one direction, and if it should tend to decrease in speed it will be turned in the other direction, and in either direction will neutralize the change of speed and restore the speed to the preselected value, and the rheostat arm 16 will come to rest in a corresponding position. It is not essential that the magnet 110 be saturated. The operation will be substantially as described if it be more nearly saturated than the magnet 109.

Figure 7:
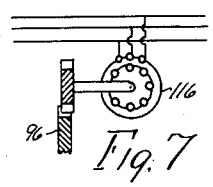

In Fig. 7 is illustrated a modification of the arrangement of Fig. 6. In this form instead of driving the two differential spiders 96 and 97 by the shaft 1, a supplemental motor 116 is provided for this purpose. A squirred cage induction motor is shown, but any type of motor may be provided, and it is immaterial whether it is strictly speaking a constant speed motor or not, inasmuch as the absolute speed at which the spiders are driven is immaterial.

Obviously, the generator of Fig. 6 may be an alternator and the current for energizing the braking magnets may be alternating current; or it may be rectified into uni-directional current; it being believed that this is so well understood by those skilled in this art as not to need illustration or further description.

Figure 8:
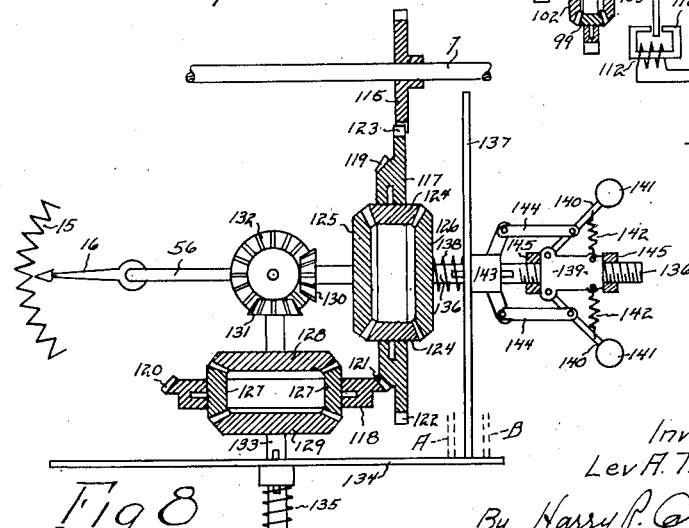

The governor of Fig. 8 is a governor of the centrifugal type. It comprises a pair of differential gearing spiders 117 and 118 provided respectively with bevel gear teeth 119 and 120 mutually meshed as at 121; and the spider 117 has also radical or spur teeth 122 meshed as at 123 with the teeth on the above described gear 115 on the load shaft 1, whereby the spiders 117 and 118 are driven in opposite directions by the load shaft.

The spider 117 rotatably supports pinions 124—124 meshed with differential gears 125 and 126; and the spider 118 rotatably supports pinions 127—127 meshed with differential gears 128 and 129.

The differential gears 125 and 128 respectively drive bevel gears 130 and 131; both of which mesh with a single bevel gear 132 connected to the governor shaft 56, the rotation of which moves the rheostat arm 16 over the resistor 15 for the purposes hereinbefore described.

The differential gear 129 rotatably drives a shaft 133 upon which is splined for rotational movement with the shaft and axial movement thereon, a relatively thin disc 134 yieldingly held toward the differential gear 129 by a compression spring 135. The differential gear 126 drives a shaft 136 on which is similarly splined a disc 137, and a compression spring 138 yieldingly holds the disc 137 away from the differential gear 126.

The disc 134 is of larger diameter than the disc 137 and the periphery of the disc 137 engages the face of the disc 134 and the two discs are maintained in positive frictional mutual engagement by the spring 135, whereby one may drive the other. The disc 137 may move or be moved axially along the shaft 136 and its diameter is such that for one axial position, namely that illustrated in solid line, the radius of the circle of contact on the disc 134 is the same as the radius of the disc 137; whereby both discs are constrained to rotate at the same velocity or revolutions per minute; and when the disc 137 is moved inwardly say to the dotted line position A, the disc 134 will be constrained to rotate faster than the disc 137, and similarly if the disc 137 be moved in the other direction say to the dotted line position B, the disc 134 will be constrained to rotate slower than the disc 137.

Mounted on the shaft 136 is a head 139 pivoted to which is a pair of governor ball arms 140 upon which are pivoted centrifugal governor balls 141—141. Springs 142—142 tend to draw the balls towards the head 139 and upon rotation of the shaft 136 the balls tend to move outwardly against the tension of the springs. The arms 140—140 are connected to the disc 137 or to a hub 143 thereon by links 144—144.

From the foregoing description it will be apparent that when the spiders 117 and 118 are driven in opposite direction by the load shaft 1, they tend to drive their associated differential gears in the same direction in which they themselves rotate. It follows that the bevel gears 130 and 131 tend to rotate in opposite directions, and that the discs 137 and 134, frictionally engaged with each other, are free to rotate in opposite directions one upon the other. If the disc 137 is in the position in which both discs rotate at the same speed, the bevel gears 130—131 will tend to rotate at the same speed, but since they are both geared to the gear 132 they will remain at rest and the governor shaft 56 will remain at rest.

Movement of the governor balls 141—141 outwardly acting through the links 144—144, will move the disc 137 inwardly, thereby causing one bevel gear 130 or 131 to rotate faster than the other and turn the bevel gear 132, and the governor shaft 56 in one direction. If the balls 141 move inwardly and thereby move the disc 137 outwardly, the governor shaft similarly is caused to rotate in the other direction.

The tension of the governor spring 142—142 is predetermined to overcome outward movement of the balls and position the discs at the one-to-one ratio described, when the load shaft 1 which is driving the balls is rotating at the predetermined or preselected speed. Thus it follows that at the preselected speed of the load shaft 1, the governor shaft 56 remains at rest, and upon an increase or decrease of that speed the governor shaft 56 is rotated in one direction or the other to effect restoring of the load shaft speed to the preselected value as hereinbefore described, whereupon the balls 141 again take up the position corresponding to the one-to-one ratio of the discs.

The head 139 may be positioned axially along the shaft 136 to change the tension of the spring 142—142 by means of a pair of lock nuts 145—145 threaded on the shaft 136; and by means of the adjustment thus provided the governor shaft 56 may be caused to remain at rest when the load shaft 1 is rotating at the preselected speed, or, upon changing the position of the head 139, the speed of the load shaft may be brought to any desired speed and thereby be predetermined.

In the governor of Fig. 1 the speed of the load shaft 1 may similarly be determined by adjustment of the tension of the spring 47 by the screw 49 and in the governor of Fig. 6 the speed of the load shaft may be predetermined by adjusting the screw 93; and by the governor of Fig. 7 the constant speed may be adjustably varied by means of an adjustable resistor in the circuit of the winding 111.

In Figs. 9 and 10 I have illustrated a structure by which the embodiment of Fig. 1 may be practiced. It comprises a tubular laminated stator 146 through which a cylindrical series or cage of conductor bars 147 are projected in suitable perforations therein and riveted over at the ends as at 148—149. The end plates are clamped between end bells 150 and 151 by bolts 152 and have feet 153 thereon for mounting upon a base.

The end bell 151 has an end plate 154 mounted thereon. The end plate 154 supports a ball bearing 155 and the end bell proper 151 supports a ball bearing 156, the two ball bearings 155 and 156 being axially aligned and axially spaced apart a substantial distance for stability and a shaft 157 is rotatably supported on the ball bearings.

A rotor 158 is mounted on the shaft 157 and this may be conveniently accomplished by providing a central annular hub 159 connected to the rotor proper 158 by spokes 160 and bolting the hub 159 to a flange 161 on the shaft 157.

The rotor 158 comprises a generally tubular body 162 on which is mounted a tubular laminated structure 163 through which are projected conductor bars 164 riveted over at the opposite ends as at 165 upon end plates 166—166. The spokes 160—160 are preferably formed as the vanes of a fan for cooling purposes to be referred to.

The shaft 157 has mounted thereon a ball bearing 167 and this may conveniently be provided for by providing on the shaft 157 a coaxial tubular flange 168 upon the outer periphery of which the hub 159 is telescoped to center it and within which the ball bearing 167 is fitted.

A field element shaft 169 has the inner end thereof supported in the ball bearing 167, and the outer end thereof is supported in a ball bearing 170 mounted in the end bell 150. The field element shown generally at 171 comprises a hub 172 keyed upon the shaft 169, and spokes 173 connecting the hub to an annular generally tubular body 174; and upon the body 174 is mounted a plurality of field poles 175 preferably constructed from laminated iron. The laminations of the field poles 175 are clamped together by long rivets 176 projected through perforations in the laminations and riveted over at their ends as at 177—177 upon end plates 178—178, the radially outer ends of which as at 179—179 are bent outwardly oppositely in the axial direction, whereby the end plates 178 provide seats for supporting and positioning direct current field energizing windings 180—180. The field poles 175 are secured to the body 174 preferably by the structure shown in Fig. 10 in connection with Fig. 9 in which it is shown that the laminations 175 are dove-tailed as at 181 into the body 174 and tightly engaged therewith by wedges 182 and prevented from axial shifting by annular plates 183—183 secured upon the body 174 in overlapping relation to the laminations 175 by screws 184—184.

The windings 180 may all be connected in series and to two collector rings 185 and 186 mounted upon insulators 187—187 on the shaft 169; and brushes 188—188, fragmentarily shown engage the collector rings by which current from an external source may be conducted thereto, the bracket supports for the brushes 188 have been omitted from the drawing to simplify it but such brush supporting brackets being well known in this art.

The shaft 169 extends outwardly from the end bell 150 as at 185 by which it may be connected to the aforesaid source of power at variable speed. Rotation of the shaft 169 by the variable speed power source, rotating the field poles 157, produces alternating current in the bars 147 which reacting upon the rotor 158 rotates it and the shaft 157. The shaft 157 extends outwardly through the end bell plate 154 as at 186 whereby it may be connected to the load to be driven, and to the hereinbefore described governor for controlling energization of the field windings 180—180 for the purposes described in connection with Fig. 1.

Air intake perforations 187 are provided in the end bell 150 and air outlet perforations 188 are provided in the end bell 151, whereby the fan vane shaped spokes 160 may propel cooling air into and through and out of the structure for well known purposes.

My invention is not limited to the exact details of construction illustrated and described. Changes and modifications may be made; and my invention is comprehensive of all such changes and modifications which come within the scope of the appended claims.

I claim:

1. In a power transmission, a stationary laminated stator element having electrical conductors inductively associated therewith; a direct-current-energized field element arranged to be rotated within the stator element and to generate alternating current in the conductors and produce a rotary magnetic field in the stator and comprising a circular series of salient field poles having energizing windings connected in series in an energizing circuit; a laminated motor rotor having electric conductors, inductively associated therewith and arranged to rotate within the stator to be rotatably driven by the rotary magnetic field in the stator.

2. In a power transmission, a stationary laminated tubular stator carrying a cage of conductor bars short circuited at end plates thereon; a direct-current-energized field element disposed within the stator and arranged to be rotated therewithin and generate current in the bars and produce a rotary magnetic field in the stator and comprising a circular series of salient field poles having energizing windings connected in series in an energizing circuit; a motor rotor comprising a laminated body carrying a cage of conductor bars short circuited at end plates thereon disposed within the stator and arranged to be rotatively driven by the rotating magnetic field in the stator and a rotary controller driven responsive to speed of the rotor comprising means to vary the current in the energizing circuit to maintain the rotor speed substantially constant.

3. In a power transmission, a stationary laminated tubular stator carrying a cage of conductor bars short circuited at end plates thereon; a direct-current-energized field element disposed within the stator and arranged to be rotated therewithin at variable speed and generate current in the bars and produce a rotary magnetic field in the stator and comprising a circular series of salient field poles having energizing windings connected in series in an energizing circuit; a motor rotor comprising a laminated body carrying a cage of conductor bars short circuited at end plates thereon disposed within the stator and arranged to be rotatively driven by the rotating magnetic field in the stator; a controller comprising a movable element movable alternately to different positions to increase or decrease the energization of the field element to maintain the rotor speed constant for variations of speed of the field element; a transmission to communicate rotary movement of the rotor to the movable element; and means responsive to rotor speed above and below a preselected speed respectively to actuate the transmission to effect communication of rotary movement to the movable element in alternate directions respectively, and to interrupt said communication at said preselected speed.

4. In a power transmission, a tubular stator element comprising short circuited conductors; a direct-current-energized field element rotatable within the stator to generate current in the conductors and produce a rotary magnetic field in the stator and comprising a circular series of salient field poles having energizing windings connected in series in an energizing circuit; and a rotor comprising short circuited conductors and rotatable within the stator and driven by the rotary magnetic field.

LEV A. TROFIMOV.

REFERENCES CITED

The following references are of record in the file of this patent:

UNITED STATES PATENTS

| Number | Name | Date |
| --- | --- | --- |
| 1,158,243 | Lakey et al. | Oct. 26, 1915 |
| 1,504,951 | Hall | Aug. 12, 1924 |
| 1,658,972 | Cordes | Feb. 14, 1928 |
| 1,848,091 | Winther | Mar. 1, 1932 |